No. 638,847. Patented Dec. 12, 1899.
C. C. KING.
ANIMAL TRAP.
(Application filed June 10, 1899.)

(No Model.)

Witnesses
Charles C. King, Inventor.
By his Attorneys,

UNITED STATES PATENT OFFICE.

CHARLES C. KING, OF MONTPELIER, INDIANA.

ANIMAL-TRAP.

SPECIFICATION forming part of Letters Patent No. 638,847, dated December 12, 1899.

Application filed June 10, 1899. Serial No. 720,125. (No model.)

*To all whom it may concern:*

Be it known that I, CHARLES C. KING, a citizen of the United States, residing at Montpelier, in the county of Blackford and State of Indiana, have invented a new and useful Animal-Trap, of which the following is a specification.

The invention relates to improvements in animal-traps.

The object of the present invention is to improve the construction of self-set and ever-set traps and to provide a simple, inexpensive, and efficient one designed for catching rats and other animals and capable of catching animals and of killing them as they are caught.

The invention consists in the construction and novel combination and arrangement of parts hereinafter fully described, illustrated in the accompanying drawings, and pointed out in the claims hereto appended.

Figure 1:
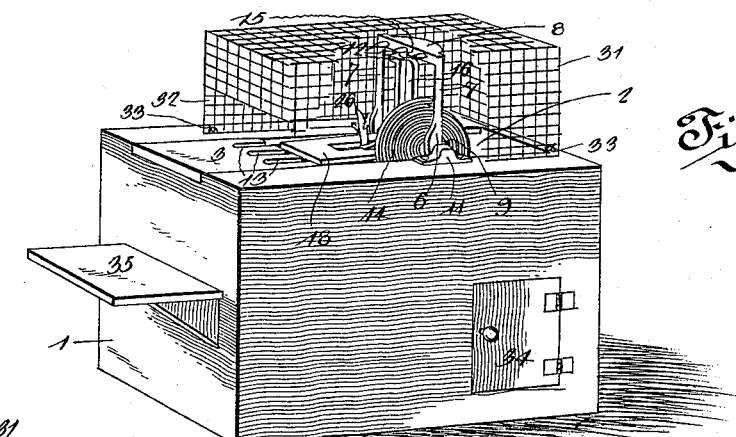
Figure 2:
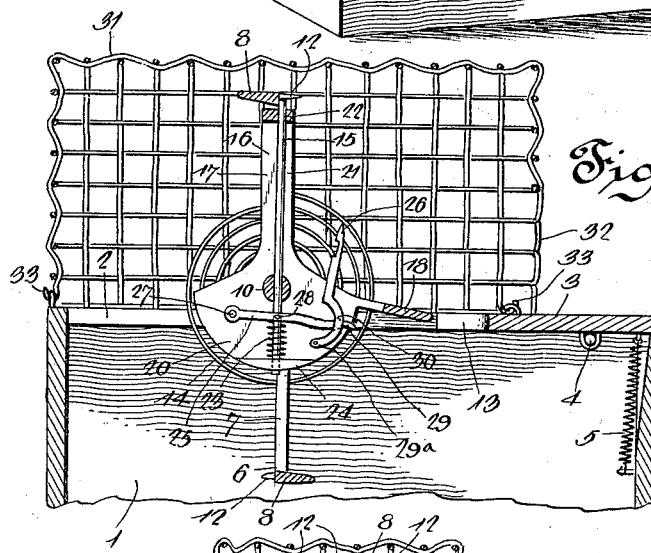
Figure 4:
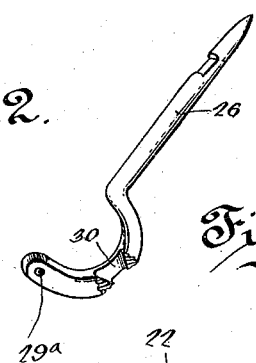
Figure 3:
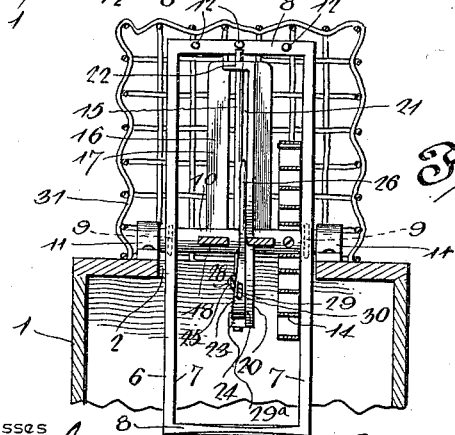
Figure 5:
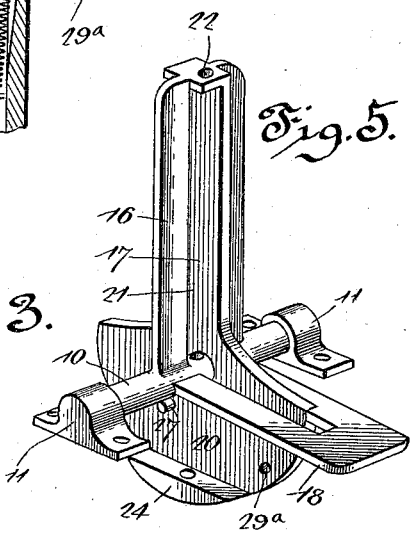

In the drawings, Figure 1 is a perspective view of an animal-trap constructed in accordance with this invention. Fig. 2 is a longitudinal sectional view of the same. Fig. 3 is a transverse sectional view. Fig. 4 is a detail view of the trigger. Fig. 5 is a detail perspective view of the support.

Like numerals of reference designate corresponding parts in all the figures of the drawings.

1 designates a receptacle provided at its top with an opening 2 and having a hinged trap-door 3 located at one end of the opening at the front of the trap. The trap-door 3 is pivotally mounted between its ends on a transverse pintle 4, journaled in suitable bearings or eyes of the receptacle and the trap-door, and the outer end of the latter is connected with a coiled spring 5, which maintains the trap-door normally in a horizontal position. The pintle 4 is arranged at a point between the center of the trap-door and the outer end thereof, and the force of the spring is sufficient to maintain the trap-door in the said horizontal position while an animal is attempting to obtain the bait, and the said animal is forced through the trap-door into the receptacle by a rotating spring-actuated frame 6. The spring-actuated rotating frame, which is oblong, is composed of parallel sides 7 and connecting cross-pieces 8, and it is provided at the center of its sides with bearings 9 for the reception of a transverse shaft 10, which has its ends mounted on suitable brackets or supports 11. The ends of the frame are provided with prongs or spurs 12, adapted to impale an animal and kill it as it is caught, and the inner end of the trap-door is provided with longitudinal slots 13, located in the paths of the spurs or projections and forming passages for the same to prevent the said spurs or projections from striking the trap-door should the trap be tripped accidentally.

The rotary striking-frame is held in a vertical position by a spring-actuated locking rod or bolt 15, mounted upon a support 16, and the said frame is actuated by a barrel-spring 14 of sufficient strength to kill the animals as they are caught. One end of the spring is secured to the shaft and its other end is attached to the adjacent side of the frame, which is adapted to be rotated for winding up the spring and setting the trap. The support 16, which is fixed to the horizontal shaft, comprises a vertical portion 17, a forwardly-extending substantially horizontal portion 18, and a depending portion 20. The vertical portion, which is provided with a longitudinal opening 21, has a perforation 22 at its top to form a guide for the upper end of the locking rod or bolt, which also passes through a perforation of the horizontal shaft. The lower portion of the locking-rod receives a spiral spring 23, interposed between a bottom flange 24 and a lever 25, which connects the locking-rod with a bait-receiving trigger 26. The lever 25, which is disposed substantially horizontally, is fulcrumed at its rear end on a pivot 27 to the depending segmental portion of the support, and it is pivotally connected between its ends at 28 to a vertically-reciprocating locking-rod. Its front end 29 is curved and is arranged within a slot 30 of the bait-receiving trigger 26, which is fulcrumed at its lower end at 29$^a$. The upper end of the coiled spring bears against the lower edge of the lever 25, and the lower end of the spring is supported upon the flange 24, which is provided with a guide-opening for the reciprocating locking-rod. The bait-receiving trigger, which extends through a longitudinal opening of the forwardly-extending portion 18 of the support 16, has a substantially semicircular lower portion, which is provided at its center with the said slot 30, and the bait-receiving trigger when drawn forward by an animal pulling on the bait is adapted to engage the curved portion of the lever and swing the latter downward, whereby the locking-rod is withdrawn from engagement with the rotary striking-frame.

The rotary striking-frame and the mechanism for setting and tripping the same are arranged within a substantially rectangular frame or casing 31, preferably constructed of woven wire and provided at its front with an opening 32 for the entrance of a rat or other animal. The receptacle is provided at the sides and back of the opening in its top with suitable eyes, which are engaged by hooks 33 of the frame or casing 31, whereby the latter is detachably mounted on the receptacle. The receptacle is provided at one side with a suitable door 34, and it has a shelf 35 at its front to enable animals to readily enter the frame or casing 31.

It will be seen that the trap is exceedingly simple and inexpensive in construction, that it possesses great strength and durability, and that it is exceedingly sensitive and is tripped by a slight pull on the trigger, which receives the bait. It will also be apparent that the rotary striking-frame when released is swung downward with sufficient force to drive the spurs or projections into an animal and to force the latter through the spring-supported trap-door, and the injury inflicted on an animal by the spurs or prongs will cause it to die in a very short time. The prongs or spurs will also prevent an animal from being thrown out of the trap by the force of the blow, and it will cause the animal to be positively dragged downward into the receptacle.

Changes in the form, proportion, size, and the minor details of construction within the scope of the appended claims may be resorted to without departing from the spirit or sacrificing any of the advantages of this invention.

What is claimed is—

1. A trap comprising a receptacle, a movable striking-frame provided with spurs, and a yielding trap-door disposed horizontally and provided at its inner end with a series of slots arranged in the path of the said spurs whereby the latter are prevented from coming in contact with the platform, substantially as and for the purpose described.

2. A trap comprising a receptacle provided at its top with a horizontal yieldingly-mounted trap-door, a frame arranged at the inner end of the trap-door, a rotary striking-frame mounted on the said frame and arranged to extend beyond the same and engage the said trap-door, and means for operating the rotary striking-frame, substantially as described.

3. A trap comprising a receptacle provided at its top with a horizontal yieldingly-mounted trap-door, a frame arranged at the inner end of the trap-door, a rotary striking-frame mounted on the said frame and arranged to extend beyond the same and engage the said trap-door, means for operating the rotary striking-frame, and a cage mounted upon the receptacle and receiving the said frames and provided at the trap-door with an opening, substantially as described.

4. In a device of the class described, the combination of a support, a rotary spring-actuated striking-frame mounted thereon, a reciprocating locking-rod arranged on the support and engaging the striking-frame, a lever fulcrumed on the support and connected with the locking-rod, and a trigger pivoted to the lever, capable of oscillating the same to release the striking-frame, and adapted to receive a bait, substantially as described.

5. In a device of the class described, the combination of a support, a rotary striking-frame pivotally mounted between its ends, a spring for actuating the striking-frame, a reciprocating locking-rod mounted on the support and arranged to engage the striking-frame, a lever fulcrumed at its rear end and connected between its ends by the locking-rod, a spring disposed on the rod and engaging the lever, and an angularly-bent trigger adapted to receive a bait and fulcrumed on the support, said trigger having a slotted connection with the lever, substantially as described.

6. In a device of the class described, the combination of a horizontal shaft, a support mounted thereon and consisting of an upwardly-extending portion, a depending portion and a forwardly-extending portion, an oblong frame fulcrumed between its ends and adapted to rotate on the shaft, a spring for actuating the frame, a reciprocating locking-rod mounted on the support and extending from the upper portion thereof, a trigger arranged at the forwardly-extending portion of the support and adapted to receive a bait, and a lever connecting the trigger with the locking-rod, substantially as described.

In testimony that I claim the foregoing as my own I have hereto affixed my signature in the presence of two witnesses.

CHARLES C. KING.

Witnesses:
LEWIS H. TATE,
JOHN T. CLOUD.